United States Patent [19]

Julian

[11] Patent Number: 4,483,910
[45] Date of Patent: Nov. 20, 1984

[54] SEALED BATTERY CABLE TERMINATION

[76] Inventor: Victor J. Julian, 2400 Belvue, Westchester, Ill. 60153

[21] Appl. No.: 483,144

[22] Filed: Apr. 8, 1983

[51] Int. Cl.$^3$ ............................................. H01M 2/30
[52] U.S. Cl. .................................. 429/179; 429/181; 429/185; 339/29 B; 339/116 R; 339/232
[58] Field of Search ................ 429/178–181, 429/183, 184, 121; 339/29 B, 116 C, 224, 232, 276 T, 277

[56] References Cited

U.S. PATENT DOCUMENTS

| | | | |
|---|---|---|---|
| 4,049,335 | 9/1977 | Julian et al. | 339/224 |
| 4,078,122 | 3/1978 | Lotzsch et al. | 429/178 X |
| 4,126,367 | 11/1978 | Miller | 339/29 B |
| 4,288,504 | 9/1981 | Julian et al. | 429/181 X |
| 4,317,870 | 3/1982 | Oellerich | 429/178 X |
| 4,389,471 | 6/1983 | Woodhouse | 429/178 |

Primary Examiner—Anthony Skapars
Attorney, Agent, or Firm—Edmond T. Patnaude

[57] ABSTRACT

A battery cable termination includes a plastic housing molded directly over a composite plate in the formation of which a metal tube is first compressed onto the bare strands of a wire cable to form a flat plate, and the tube is again compressed in a forging operation to provide an annular recess at the top and an annular complementary bottom surface for providing a large area contact surface. The housing includes a depending, outwardly flared, integral skirt which sealably contacts a battery case and also sealably contacts the shoulder of a battery terminal stud when the termination is operatively positioned on the stud with a threaded portion of the stud extending through a hole through said annular recess and said complementary bottom surface.

9 Claims, 5 Drawing Figures

SEALED BATTERY CABLE TERMINATION

The present invention relates in general to cable terminations for connecting battery cables to threaded terminal studs of wet cell batteries, and it relates more particularly to a new and improved termination which provides a battery mechanical and electrical connection to the terminal stud and prevents contamination of the metal parts of the termination by acidic battery fumes which leak from the case along the outer surface of the stud of the associated battery.

BACKGROUND OF THE INVENTION

One type of wet cell battery commonly used in automotive vehicles includes a pair of terminals extending from the top or side of the battery case. A threaded stud extends from a relatively large diameter shoulder portion which protrudes a short distance from the case. The prior art terminations have incorporated a large area flat contact surface which rests on the surface of the terminal shoulder when the threaded stud extends through a mounting hole in the flat contact surface of the termination. A nut is threaded onto the stud to press the contact surface tightly against the shoulder.

Unless the contact surface at the bottom of the termination is perfectly flat and parallel to the top surface against which the nut is tightened, an excessive torque is required to prevent rocking of the termination on the terminal and to provide a low ohmic connection between the termination and the battery terminal. The use of too great a torque can strip the threads on the terminal stud or otherwise damage the battery.

Battery cable terminations have included a plastic housing or cover molded over the metallic parts of the termination and such terminations have had associated with them several types of seals for sealing the termination from the battery acid fumes and from the elements. U.S. Pat. No. 4,049,335 describes a battery cable termination in which the molded cover sealably engages the terminal shoulder to prevent the battery acid fumes from creeping along the terminal and corroding the termination. U.S. Pat. No. 4,126,367 describes a battery cable termination which includes a sealing bead which contacts the battery case throughout an area surrounding the terminal. It would be desirable to provide an improved seal to the battery case and which also prevents the battery acid fumes from reaching the metal parts of the termination.

SUMMARY OF THE INVENTION

Briefly, there is provided in accordance with the present invention a novel battery cable termination which combines an improved electric and mechanical contact with a flexible sealing skirt which prevents the battery acid fumes from escaping to the ambient and from leaking into the electric contact parts of the termination. The termination includes an apertured contact plate which is forged to provide an annular recess in the top and a complimentary raised annular surface on the battery, these two annular surfaces being flat and mutually parallel assure large contact areas to the terminal shoulder and to the nut which is threaded onto the terminal over the termination plate. A molded plastic cover encloses the contact plate and includes a thin walled, flexible, resilient skirt which depends along side the terminal shoulder into good sealing contact with the battery case. In a preferred embodiment of the invention the skirt has a small outward flare to insure that the skirt deflects inwardly into sealing contact with the terminal shoulder, whereby the sealing skirt seals the battery acid fumes from the ambient and also seals the metal parts of the termination from the battery acid fumes.

GENERAL DECRIPTION OF THE DRAWING

The present invention will be better understood by a reading of the following detailed description taken in connection with the accompanying drawing wherein.

DETAILED DESCRIPTION OF PREFERRED EMBODIMENTS OF THE INVENTION

Figure 1:
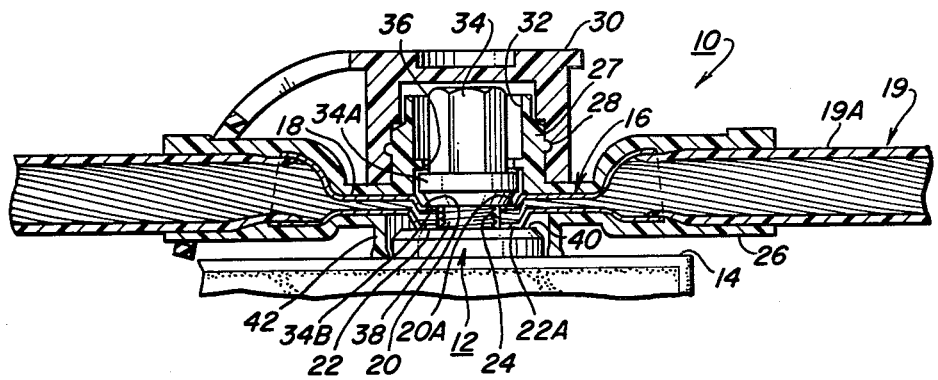
FIG. 1 is a cross-sectioned, elevational view of an in-line battery cable termination assembled to a battery terminal of the type including a threaded stud.
Figure 2:
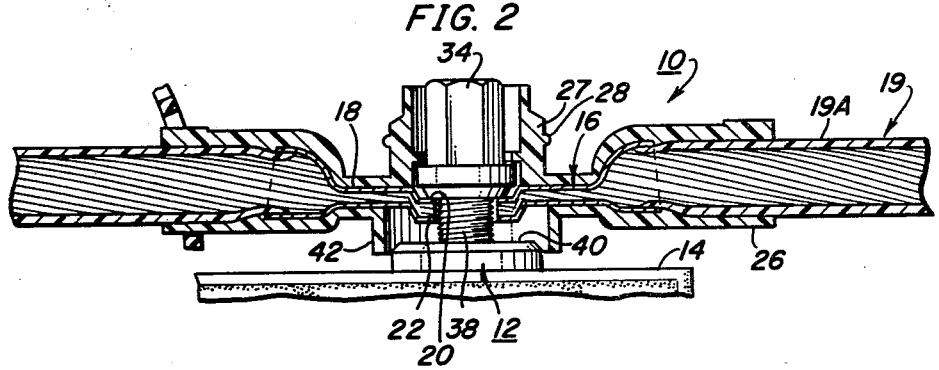
FIG. 2 is a cross-sectioned, elevational view, similar to that of FIG. 1, showing the termination of FIG. 1 during assembly to a battery terminal.

Referring to FIGS. 1 and 2, there is shown an in-line type battery cable termination 10 and a terminal 12 protruding from the outer surface 14 of a wet cell battery. In FIG. 1, the termination 10 is shown in the operative position wherein it is tightened down onto the terminal 12, while in FIG. 2 the termination 10 is shown during assembly thereof to the terminal 12.

The termination 10 includes a composite terminal plate 16 which includes a metal sleeve 18 through which the metal wire strands of a battery cable 19 extend. During the manufacture of the termination, a metal tube is placed over a portion of the cable from which the insulation has been stripped and the central portion of the tube is then compressed in a forging operation into a generally planar configuration with the wire strands tightly compressed therein. In accordance with one aspect of the present invention, the generally flat terminal plate is further compressed in a second forging operation to provide a circular recess 20 in the top and a complementary circular boss 22 on the bottom. A circular hole 24 is then punched through the center of the boss 22, and the flattened tube and the enclosed wire strands are soldered together to form the solid composite plate 16.

The bottom of the recess 20 is a planar annular surface 20A surrounding the hole 24 which is planar and parallel to the planar annular surface 22A of the boss 22. The second forging operation assures that these two annular surfaces are planar and do not have any protruding irregularities.

A plastic cover 26 is molded over the terminal plate 16 and over a short length of the insulation covering 19A on the battery cable 19. The cover 26 includes an integral, upstanding sleeve 27 which is coaxial with the hole 24 and has an external annular bead 28 which is received in a complementary groove in the skirt of a resilient sealing cap 30. The inner wall of the sleeve 27 is identified by the reference number 32 and has an internal diameter substantially equal to the external diameter of the recess 20. A cap nut 34 has an external annular flange 34A located below an internal flange 36 which prevents spurious removal of the nut from the termination. The nut has a planar bottom surface 34B which is truly perpendicular to the longitudinal axis of the nut. Consequently, when the nut 34 is tightened onto the threaded stud portion 38 of the terminal 12 to press the annular bottom surface 22 of the terminal plate against the planar annular shoulder 40 of the terminal, the abutting surfaces are all mutually parallel. Thus there is no deformation of the terminal plate and a precise, non-rocking fit between the terminal plate 16 and the battery terminal is provided.

The cover 26 includes an integral, thin-walled skirt 42 having an internal diameter somewhat larger than the external diameter of the shoulder of the battery terminal so as to fit over the shoulder when the termination is placed onto the terminal. As may best be seen in FIGS. 1 and 2, the skirt 42 depends below the bottom of the boss 22 a distance substantially greater than the distance between the terminal shoulder surface 40 and the surface 14 of the case so that when the termination is tightened against the shoulder 40 the skirt not only contacts the case, but deflects so as to assure that a complete seal is provided irrespective of surface irregularities in the engaged portion of the surface 14 of the case.

In this embodiment of the invention the seal which is provided between the skirt 42 and the battery case prevents the acidic battery fumes from escaping directly to the atmosphere. Any fumes which leak into the termination on the inside of this seal are retained within the termination by the sealing cap 30.

Figure 3:
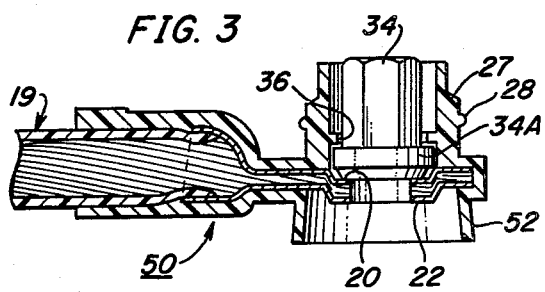
FIG. 3 is a cross-sectioned, elevational view of the end termination of a battery cable embodying the present invention.
Figure 4:
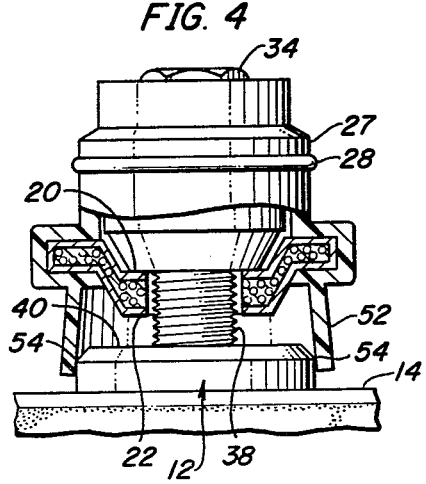
FIG. 4 is a partially sectioned end view of the termination of FIG. 3 during assembly to a battery terminal.
Figure 5:
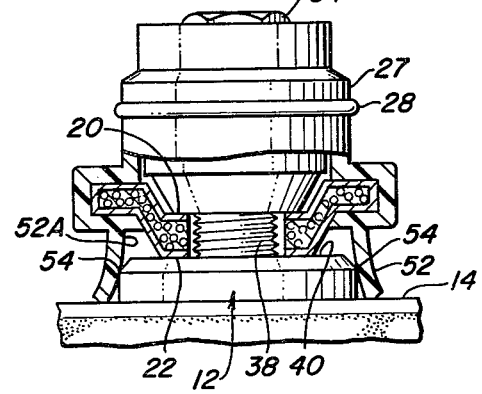
FIG. 5 is a partially sectioned end view of the termination of FIG. 4 after assembly to a battery terminal.

Referring to FIGS. 3, 4 and 5, there is shown an embodiment of the invention wherein the plastic cover of a battery cable termination seals the acidic battery fumes from the atmosphere and also from the metallic parts of the termination itself. The termination 50 is similar to the termination 10 and like parts are identified by the same reference numbers. The invention is equally applicable to in-line as well as end terminations wherefor one embodiment of the invention is shown in connection with an inline termination, i.e., the termination 10, and the other embodiment is shown in connection with an end termination i.e., the termination 50.

In the termination 50, there is provided a thin-walled sleeve 52 which, like the sleeve 42 in the termination 10, is integral with the molded cover and flares outwardly toward the bottom. The internal diameter at the bottom of the skirt is appreciably greater than the external diameter of the terminal shoulder while the internal diameter at the top of the skirt is less than the external diameter of the terminal shoulder. Because of the outward flare, as the nut 34 is tightened onto the terminal stud the skirt deflects inwardly and sealably engages the circular edge 54 as shown in FIG. 5. The depending boss on the terminal plate 16 positions the contact surface 22 well below the base 52A of the skirt 52 to provide the necessary length and flexibility which causes the skirt to bend inwardly into sealing engagement with the edge 52A of the terminal when the surface 20 abuts the annular terminal surface 40. Consequently, the acidic battery fumes which escape from the battery case along the surface of the terminal 12 are trapped in the annular space between the edge 54 and the annular area of the case engaged by the end of the skirt. It may thus be seen that in this embodiment of the invention the metallic portions of the termination 50 are completely sealed from the battery fumes. If desired, a sealing cap may be used to protect the metal parts of the termination from the natural weather conditions.

The present invention thus provides a new and improved battery cable termination which provides an improved electrical and mchanical connection to an associated battery terminal and which also provides an improved seal for containing the acidic battery fumes which escape from the battery case along the surface of the battery termination member.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A termination assembly for connecting an electric cable to a terminal stud of a battery, said terminal stud including a raised shoulder portion disposed adjacent to a battery case and a threaded stud portion, said assembly comprising in combination a tubular terminal member into which said cable extends, means electrically and mechanically connecting said terminal member to said cable, said terminal member and the portion of said cable located in said terminal member having an aperture extending therethrough from the top to the bottom thereof for receiving said threaded stud portion when said terminal member is positioned against said shoulder, an insulating cover molded of a resilient plastic directly over the top and bottom surfaces of said terminal member and having openings formed therein above and below said terminal member in alignment with said aperture, said cover including an integral annular sleeve portion surrounding said aperture and extending upwardly from the top surface of said terminal member, a nut disposed in said sleeve for threaded engagement with said threaded stud portion, said terminal member being provided on said top surface with and annular recess surrounding said aperture, said nut having a bottom surface substantially complementary to the surface of said recess, and said complementary surface of said nut depending into said recess into engagement with said top surface of said terminal member when said nut is tightened onto said stud, the bottom surface of said terminal member being provided with a raised annular surface surrounding said aperture for engagement with said shoulder throughout an annular area surrounding said threaded stud portion when said nut is tightened onto said stud, and said plastic cover including an integral tubular skirt surrounding and spaced from said raised annular surface, the internal diameter of said skirt, when stressed, being substantially greater than the external diameter of said annular shoulder, and said skirt depending below said raised annular surface by a distance exceeding the distance between the top surface of said shoulder and the surface of said battery case immediately surrounding said annular shoulder, whereby the tightening of said nut on said stud provides a good electrical and solid mechanical connection between said terminal member and said terminal stud and a pressure seal between said plastic cover and said battery case to prevent acid fumes leaking from said battery along the surface of said terminal stud from escaping to the ambient.

2. The termination assembly set forth in claim 1 wherein said terminal member and said cable are electrically and mechanically connected together by compressing said terminal member tightly onto said cable in a first pressing operation to provide coplanar upper and lower surfaces on said terminal member, and said annular recess and said raised annular surface are subsequently formed in said terminal member by a second pressing operation, the bottom of said raised annular surface being substantially flat and having a sufficiently small cross-sectional area to provide a gas tight seal to said shoulder when said nut is tightened onto said stud.

3. The termination assembly as set forth in claim 2, wherein said skirt is outwardly flared so that the intermediate portion deflects inwardly as said nut is tightened and compresses said skirt against said case.

4. The termination assembly as set forth in claim 2 wherein said skirt is dimensioned so as to be compressed against and sealably engage an annular area of said terminal stud surrounding said threaded stud when said nut has been tightened onto said stud, whereby said skirt is sealed to said battery case and to said annular shoulder to prevent any acid fumes leaking from said battery along the surface of said terminal stud from escaping to the ambient and from corroding said terminal member.

5. A termination assembly for connecting an electric cable to a terminal stud of a battery, said terminal stud including a raised shoulder portion disposed adjacent to a battery case and a threaded stud portion, comprising in combination a tubular terminal member into which said cable extends, means electrically and mechanically connecting said terminal member to said cable, said terminal member and the portion of said cable located in said terminal member having an aperture extending therethrough from the top to the bottom thereof for receiving said threaded stud portion when said terminal member is positioned against said shoulder, an insulating cover molded of a resilient plastic over the top and bottom surfaces of said terminal member and having openings formed therein above and below said terminal member in alignment with said aperture, a nut for threaded engagement with said threaded stud portion to tighten said terminal member against said shoulder portion of said terminal stud, said plastic cover including an integral, tubular skirt surrounding said aperture, said skirt being outwardly flared and depending below said bottom surface of said terminal member, the wall thickness and length of the skirt are dimensioned so that the intermediate portion of said skirt deflects inwardly as said nut is tightened onto said threaded stud portion and comprises said skirt against said battery case, whereby the tightening of said nut onto said stud provides a pressure seal between said plastic cover and said battery case to prevent acid fumes leaking from said battery along the surface of said terminal stud from escaping to the ambient.

6. The termination assembly as set forth in claim 5 wherein said skirt is dimensioned so as to be compressed against and sealably engage an annular area of said stud surrounding said threaded stud when said nut has been tightened onto said stud, whereby said skirt is sealed to said battery case and to said annular shoulder to prevent any acid fumes leaking from said battery along the surface of said terminal stud from escaping to the ambient and from corroding said terminal member.

7. A termination assembly for connecting an electric cable to a terminal stud of a battery, said terminal stud including a raised shoulder portion disposed adjacent to a battery case and a threaded stud portion, said assembly comprising in combination a tubular terminal member into which said cable extends, means electrically and mechanically connecting said terminal member to said cable, said terminal member and the portion of said cable located in said terminal member having an aperture extending therethrough from the top to the bottom thereof for receiving said threaded stud portion when said terminal member is positioned against said shoulder, an insulating cover molded of a resilient plastic directly over the top and bottom surfaces of said terminal member and having openings formed therein above and below said terminal member in alignment with said aperture, said cover including an integral annular sleeve portion surrounding said aperture and extending upwardly from the top surface of said terminal member, a nut disposed in said sleeve for threaded engagement with said threaded stud portion, said terminal member being provided on said top surface with an annular recess surrounding said aperture, said nut having a bottom surface substantially complementary to the surface of said recess, and said complementary surface of said nut depending into said recess into engagement with said top surface of said terminal member when said nut is tightened onto said stud, the bottom surface of said terminal member being provided with a raised annular surface surrounding said aperture for engagement with said shoulder throughout an annular area surrounding said threaded stud portion when said nut is tightened onto said stud, and said plastic cover including an integral skirt surrounding and spaced from said raised annular surface, and said skirt is outwardly flared and depending below said raised annular surface by a distance exceeding the distance between the top surface of said shoulder and the surface of said battery case immediately surrounding said annular shoulder, whereby the tightening of said nut provides a good electrical and solid mechanical connection between said terminal member and said terminal stud and the intermediate portion of said skirt deflects inwardly as said nut is tightened and compress said skirt against said case creating a pressure seal between said plastic cover and said battery case to prevent acid fumes leaking from said battery along the surface of said terminal stud from escaping to the ambient.

8. The termination assembly set forth in claim 7 wherein said terminal member and said cable are electrically and mechanically connected together by compressing said terminal member tightly onto said cable in a first pressing operation to provide coplanar upper and lower surfaces on said terminal member, and said annular recess and said raised annular surface are subsequently formed in said terminal member by a second pressing operation, the bottom of said raised annular surface being substantially flat and having a sufficiently small cross-sectional area to provide a gas tight seal to said shoulder when said nut is tightened onto said stud.

9. The termination assembly as set forth in claim 8 wherein said skirt is dimensioned so as to be compressed against and sealably engage an annular area of said terminal stud surrounding said threaded stud when said nut has been tightened onto said stud, whereby said skirt is sealed to said battery case and to said annular shoulder to prevent any acid fumes leaking from said battery along the surface of said terminal stud from escaping to the ambient and from corroding said terminal member.

* * * * *